Dec. 31, 1963   J. E. LINDBERG, JR   3,116,212
NUCLEAR REACTOR HEAT EXCHANGE, MODERATION, AND SHIELDING SYSTEM
Filed Dec. 27, 1960   4 Sheets-Sheet 1

INVENTOR.
JOHN E. LINDBERG
BY
ATTORNEY

Dec. 31, 1963  J. E. LINDBERG, JR  3,116,212
NUCLEAR REACTOR HEAT EXCHANGE, MODERATION, AND SHIELDING SYSTEM
Filed Dec. 27, 1960  4 Sheets-Sheet 2

INVENTOR.
JOHN E. LINDBERG
BY
ATTORNEY

United States Patent Office 3,116,212
Patented Dec. 31, 1963

3,116,212
NUCLEAR REACTOR HEAT EXCHANGE,
MODERATION, AND SHIELDING SYSTEM
John E. Lindberg, Jr., Lafayette, Calif.
(1024 Adrienne Drive, Alamo, Calif.)
Filed Dec. 27, 1960, Ser. No. 78,774
16 Claims. (Cl. 176—39)

This invention relates to atomic reactors. More particularly it relates to a novel heat exchange, moderation, and shielding system for atomic reactors. This application is a continuation-in-part of application Serial No. 732,228, filed May 1, 1958, now abandoned.

Conventional atomic reactors employ one medium, such as liquid sodium, to transfer the heat from the reactor to a heat exchanger, a second medium, such as lead, to shield personnel from the reactor radiations, and a third medium, such as graphite, may be used for moderation of the reactor. The present invention greatly increases the efficiency of these reactors by using a single medium to accomplish all the heat exchanging, and some or all of the moderation and shielding. Furthermore, the advantages of that medium for heat exchange alone are unique and are so great that these advantages alone provide an impelling reason for employing the present invention.

This invention, whose objects may be inferred from the preceding paragraph and from the following more complete description, is characterized by the use of thermal dissociation or chemical transformation of the heat exchange medium. Greatest advantage of this may be obtained by using certain metallic hydrides, some of which are especially suitable because of their novel abilities to serve as moderators and shielding agents while others which do not have those additional properties may also be used as heat exchangers alone.

I have already described and claimed heat-exchange systems using these hydrides and some other materials in my copending application Serial No. 695,357, filed November 8, 1957, now Patent 3,075,361 of January 29, 1963, and that application is intended to be incorporated herein by reference for use where applicable. In that application the advantages of the hydrides as heat-transfer media are described. These include the fact that the heat of transformation at the step of formation of the hydrides and at the step of dissociation of the hydrides is so great that it far outweighs, in heat carrying capacity, the effect of heat-transmission by the specific heats of the transferred metal, gas, and hydride. This heat energy of transformation may typically be considered as being taken from a heat source by the endothermic breaking up of the hydride into hydrogen and metal, chemically stored in these materials, and released later by an exothermic recombination of the hydrogen and the metal at a heat sink. The usable reactions are reversible within the range of temperatures encountered and are of the kind where the heat of transformation is very large. Typical examples are set forth in the application Serial No. 695,357 already referred to, and they are of use in the present instance. However, the present invention also points out that certain hydrides are preferable to others because of their moderating and/or shielding ability.

Other objects, advantages, and features of the invention will be explained in the following detailed description.

Figure 1:
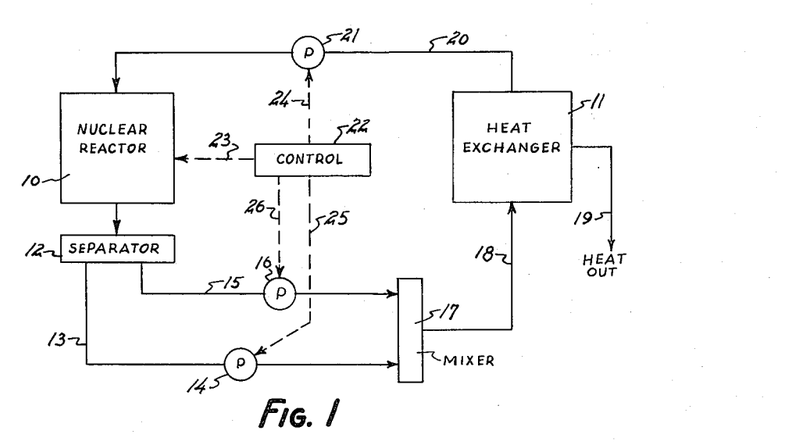
FIG. 1 is a block diagram showing a nuclear reaction system wherein a simplified heat transfer system embodying the present invention is used to transfer heat from a nuclear reactor to the heat exchanger.

The simplified arrangement shown in FIG. 1 will first be considered. As shown in this block diagram, the heat transfer medium is circulated between a nuclear reactor 10 and a heat exchanger 11. The heat exchange medium is heat dissociable so that a thermal transformation separates it into two substances at the heat source and recombines it at the heat sink. A typical example would be that of lithium or zirconium hydride, which is broken upon into lithium or zirconium metal and hydrogen gas at the nuclear reactor 10, then sent to a separator 12 where part or all of the hydrogen gas is separated from the zirconium or lithium metal. The gas may be sent then through one line 13 via a pump 14, while the metal may be sent through a second line 15 and a pump 16. The gas and metal may be mixed together again at a mixer 17 and passed through line 18, which is normally short, to the heat exchanger 11. At the heat exchanger the lithium or zirconium is combined with the hydrogen to form lithium hydride or zirconium hydride. The reaction is exothermic, and a steam system or the like takes the resultant heat out through line 19. The metallic hydride may then be returned to the nuclear reactor via line 20 by a pump 21. The pumps 14, 16, and 21 and the reactor 10 may be under regulation by the control 22 through control transmissions 23, 24, 25, and 26, indicated by broken lines.

The pumps 14, 15, and 21 may be employed to vary the equilibrium power level of the reactor 10, by their respective control of the hydrogen pressure at the reactor 10 and the heat exchanger 11, and thus the degree of ingassing of hydride may be controlled as the material enters and leaves the reactor 10, while the hydride flow rate is controlled through the line 20. All this will be explained later, and reference is made to my co-pending application Serial No. 695,357, filed November 8, 1957, for a detailed explanation of the heat transformations of the hydrides.

Zirconium hydride and lithium[7] hydride are of particular interest as heat exchange media for atomic energy applications, because the neutron cross-sections of hydrogen, zirconium and lithium[7] make them useful as moderators. Also, zirconium hydride and lithium hydride are good radiation shields. Consequently, these hydrides can serve a triple function in the reactor; that is, they may serve as moderators, heat exchange media, and shields against hazardous radiation.

For an example, in a system like that shown in FIG. 1 where zirconium hydride is used with a source temperature of the reactor 10 of 1000° C., the hydrogen content is 45 cubic centimeters per grams of hydride. At a sink temperature of 250° C. at the heat exchanger 11, the hydrogen content is 225 cubic centimeters per gram of hydride. Assuming a heat transfer rate of 10,000 kw., the transfer rate may be calculated and the transfer rate coefficient (obtained from known tables as explained in my co-pending application Serial No. 695,357) found to be 4.5 lbs. per kw. hour giving a transfer rate of 45,000 lbs. per hour of the hydride. In spite of the very wide range of temperatures, a factor that would normally be favorable to specific-heat types of heat exchangers, like the light metal sodium, the transfer rate for liquid sodium under those conditions would be 76,000 lbs. per hour. So it can be seen that zirconium hydride, though heavier, is more efficient even on a weight basis.

An even better basis for comparison is the *volume* of coolant which must be pumped per unit time, as this determines how much may be saved in structural cost and weight. Moreover, since smaller, more compact reactors require less shielding, a further weight and cost saving can be made when the volume of the reactors is reduced. Considering the above example in terms of volume, 127 cubic feet per hour of zirconium hydride will transfer 10,000 kw., while 1255 cubic feet per hour of liquid sodium is required to transfer the same energy per hour. Thus the zirconium hydride is more than 10 times as good as sodium on a volume-comparison basis.

Figure 2:
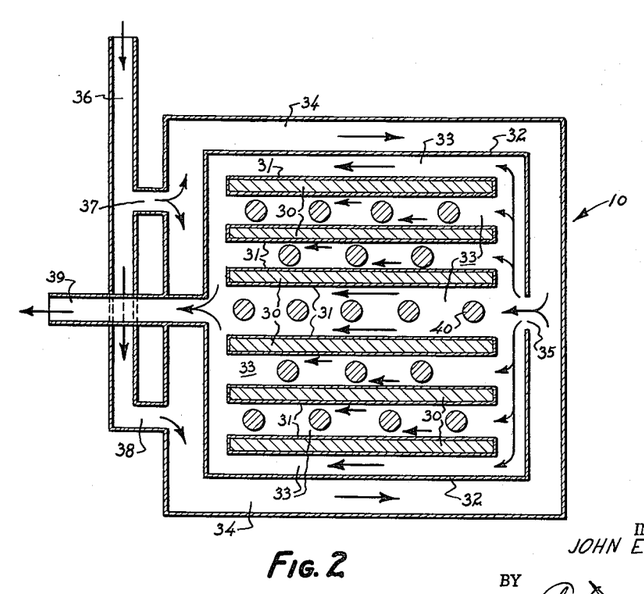
FIG. 2 is an enlarged view in elevation and in section, but somewhat diagrammatic, of a nuclear reactor suitable for use in the present invention.

A typical internal arrangement of the reactor 10 is shown in FIG. 2. Here fuel elements 30 of uranium, thorium, or other suitable material, are encased within a thin shell of a material 31 such as molybdenum or ceramics which do not react unfavorably with the heat transfer medium and are relatively impermeable to hydrogen and are poor moderators. These encased fuel elements 30 are disposed within a gas-tight enclosure 32 in such fashion that a powdered or liquid metal, powered or liquid metal hydride, and gaseous hydrogen may flow around and between them in the passages 33. Whether the solid material is powdered or liquid will depend upon the operating temperatures desired and the type of metal and metal hydride used. In some instances, liquid metal and liquid metal hydride are preferable throughout the cycle of operation. Such operation can be obtained by using lithium[7] hydride. In other instances, powdered materials are preferred, and such operation can be obtained by using zirconium hydride.

The enclosure 32 may be surrounded by a gas-tight duct 34. Before the heat exchange medium can enter the passages 33 in the enclosure 32 through an aperture 35, it must pass from an inlet pipe 36 through one of openings 37 and 38 into this duct 34 and thence completely around the reactor 10, on all sides of it, thereby serving as a shield for the enclosure 32.

After entering the enclosure 32 and flowing through the passages 33, it flows out through the outlet 39. Arrows in FIG. 2 indicate the general flow pattern. To aid control of the nuclear reaction, cadmium rods 40 (or the like) may be used. Preferably these are arranged to move in planes perpendicular to that through which the section has been taken. Possibly it should be repeated that FIG. 2 is only a diagram and that, while only six fuel elements 30 are shown, any desired number may be placed within an enclosed chamber 32 of this type.

In operation of the reactor 10, a withdrawal of some or all of the control rods 40 from the reactor 10 by the control means 22 acts to increase the temperature of the reactor in the passages 33, due to an accelerated nuclear reaction which such withdrawal causes. Supposing, for example, that the heat exchange medium is to be circulated largely in the liquid state, as would be the case where lithium hydride is used. The heat produced by the accelerated nuclear reaction upon withdrawal of the control rods may act to liquefy whatever solid hydride or metal is within the reactor 10. If the system had been allowed to become fully outgassed of its hydrogen before being shut down, it is possible to introduce hydrogen to the whole system under pressure, and the heat of reaction of the hydrogen with the outgassed metal will help cause it to liquefy so that the liquid can be pumped. Of course, when powdered hydride is used, and zirconium hydride is very suitable for use in this form, the liquefying procedure is not required.

The increased radioactivity in the vicinity of the activated reactor is shielded by the lithium hydride or zirconium hydride passing through the outside region 34 around the reactor chamber 32. When the temperature has risen to the proper level and when the metallic hydride is inside the passages 33, it is outgassed in an endothermic reaction so that considerable heat is absorbed. Typical amounts of heat absorbed in such a reaction are shown in Table I.

TABLE I

*Heat of Transformation of Some Typical Metallic Hydrides*

| Hydride of— | Heat of Transformation, gram calories per gram of compound |
| --- | --- |
| Lithium | 2,705 |
| Sodium | 548 |
| Potassium | 333 |
| Calcium | 1,161 |
| Strontium | 469 |
| Barium | 293 |
| Titanium | 634 |
| Zirconium | 417 |
| Palladium | 23.7 |

In addition to heat of transformation and the moderation and shielding abilities (discussed later), cost and many other factors may influence the choice of the particular hydride in any particular instance. However, speaking broadly, all the following hydrides are usable, even though some are better than others: the hydrides of lithium, sodium, potassium, rubidium, cesium, calcium, strontium, barium, scandium, yttrium, the rare-earth metals (atomic numbers 57–71), titanium, zirconium, hafnium, vanadium, niobium, tantalum, palladium, and chromium, and alloys of these metals with each other.

When the hydrogen has been outgassed, the outgassed metal is a poor moderator; the moderating action of the hydride appears to be due chiefly to the great amount of hydrogen contained in its ingassed state. The resultant decrease in moderating efficiency tends to slow the nuclear reaction, since the neutron energies become too high to support fission in the fuel at the same rate. Thus it is possible to design a reactor 10 to reach a desired equilibrium temperature (due to an equilibrium value of nuclear reactivity) with a given metallic hydride, a given flow rate, and a given hydrogen pressure maintained therein.

The present system is unique in that the heat transfer medium itself is used to exert control over the nuclear reaction. This, of course, is not the case where water or liquid sodium is used as the heat transfer medium. The control over the nuclear reaction which is exerted by the moderating effect of hydrogen gas and of the hydrogen contained in the metal hydride is dependent upon three things:

(1) The control is exerted in part by the *amount of hydrogen in the hydride* returned to the reactor 10 from the heat exchanger 11 by the pump 21. The power level or equilibrium of the reactor 10 is proportional to the degree of ingassing of the hydride as it enters the reactor 10. In other words, the moderating efficiency of the hydride increases in direct proportion to the amount of hydrogen in the hydride; i.e., the degree of ingassing thereof.

(2) The *pressure of the hydrogen gas maintained* within the chamber 32 affects the rate of nuclear reaction and therefore the reactor power level, because the moderating effect of hydrogen increases with an increase in the amount of hydrogen held in the hydride or as free gas around the hydride and both these factors increase as the gas pressure is increased.

(3) The *rate of flow hydrides through the reactor* 10 exerts control over the nuclear reaction, because the average percent of total ingassing of the hydride decreases with a decrease in flow rate. Similarly with an increase in flow rate, the average percent of total ingassing of hydrogen increases and the reactor activity increases.

To explain further the third factor, although a reactor tends to compensate somewhat for changes in the flow rate of hydride through it, a change in flow rate brings about a new equilibrium power level. Thus, an increase in hydride flow rate increases the average state of ingassing of the hydride and thereby produces more efficient moderation of the nuclear reaction and an increase in nuclear activity. Although this higher level of activity tends to outgas the hydride more completely than before, due to the resultant increase in reactor temperature, the consequent degree of outgassing will not be as high as at the lower hydride flow rate (because the temperature has less time to act on the hydride); however, the power level is increased as the hydride is circulating faster and is being exposed to a higher source temperature. Similarly, if the flow rate is maintained at a substantially constant level, the effect described tends to hold the nuclear reaction at its equilibrium point.

An important feature of this invention is that failure of the pumping system tends only to decrease the reactor activity. This should be contrasted with failure of equipment when conventional heat transfer media are being used, because then a destructive increase in the reactor temperature is produced, since those heat exchange media exert no control over the nuclear reaction itself. Therefore, in the prior art, failure of the system pumping the heat transfer medium could result in destructive temperatures unless outside control means, such as the control rods 40, were operated in time.

The rate at which the heat is exchanged at the heat exchanger 11 is dependent upon the temperature and pressure maintained there and upon the quantities of hydrogen gas and outgassed metal available from the mixer 17 for recombination in the heat exchanger 11. The temperature within the heat exchanger 11 is, of course, dependent upon the rate of heat removed from the heat exchanger through the line 19 as well as upon the rate of reaction of the metal and the hydrogen to produce hydrides therein and to the quantities of the reagents involved. Thus, with the different hydrides, completely different temperature levels will be obtained with the same flow rates; and with the same hydride, different temperatures will be obtained when different flow rates are employed.

Some hydrides are better than others for each of the three purposes given above. For illustration only, the following table will be helpful, although it does not list every usable material.

TABLE II

*Examples of Good Heat Transfer Materials for Use in Nuclear Reactors, Arranged in Order of Decreasing Value*

| Weight Basis | Volume Basis |
|---|---|
| LiH | $TiH_2$ |
| $CaH_2$ | $ZrH_2$ |
| $TiH_2$ | LiH |
| NaH | $CaH_2$ |
| $ZrH_2$ | NaH |
| KH | KH |
| $CrH_2$ | $CrH_2$ |

Good moderators and shielding agents include the hydrides of lithium, zirconium, calcium, potassium, sodium, titanium, and tantalum, not necessarily in that order. Moderation ratios are calculated by well-known formulae, as are shielding abilities.

In addition, other compounds comprising hydrogen, deuterium, and beryllium, are good moderators. Also, the aluminohydrides and particularly the borohydrides will make excellent shielding materials. The value of the above materials as shielding or moderating materials will decrease as the hydride is degassed.

When conventional methods of heat transfer are used, it is difficult, if not impossible, to change the amount of heat being generated within the reactor 10 without changing the amount of heat transferred to the sink or heat exchanger 11 and vice versa. But by using the heat transfer medium of the present invention and using a system like that shown in FIG. 3, it becomes possible to store the heat energy as chemical energy for the desired period of time. Therefore, independent control may be exerted over (1) the time rate at which energy is delivered to the heat exchanger, or (2) the time rate at which energy is taken from the nuclear reactor 10. The system of FIG. 3 makes it possible to balance a desired rate of removal of heat at 19 from a heat exchanger 11 with a simultaneously desired rate of nuclear reaction within the reactor 10.

Figure 3:
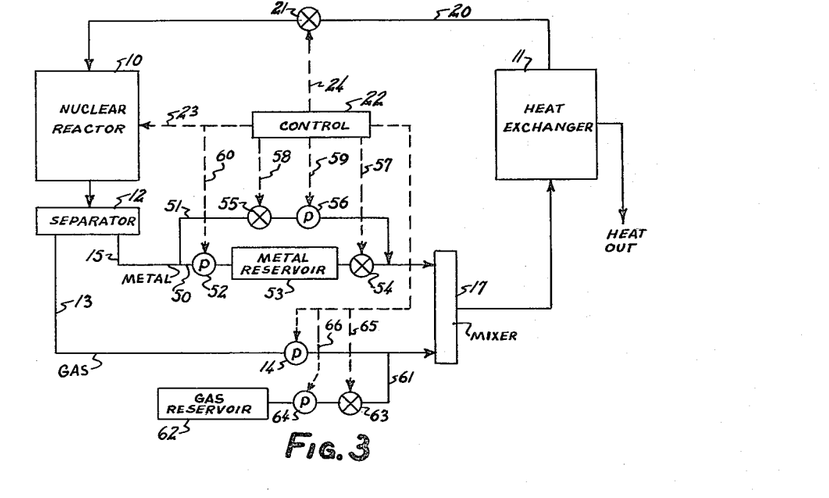
FIG. 3 is a block diagram of a more complex system embodying the invention, similar to the system of FIG. 1 but making it possible to store the heat energy for a while and thereby achieve a short-term independence of the heat exchange and nuclear reactor.

In FIG. 3 the hydrogen and the outgassed metal leave the reactor 10 together but are partially or fully separated by the separator 12 to go into separate conduits 13 and 15. The metal conduit 15 is divided into two lines 50 and 51. The line 50 is provided with a pump 52 for moving the metal into and out from reservoir 53 in which metal may be stored, instead of being used as it is produced in the reactor 10. A cut-off valve 54 may be used to prevent or permit the flow of metal from the reservoir 53 into the mixer 17. The line 51 is provided with a valve 55 and a pump 56. As shown in the broken lines, the control means 22 may be used to achieve automatic or controlled operation through transmission 57 to the valve 54, 58 to the valve 55, 59 to the pump 56, and 60 to the pump 52.

If the valves 54 and 55 are both closed, the metal flows only into the reservoir 53 and is stored. If the valve 54 is closed and the valve 55 is open, some proportion of the metal will flow through the line 51 directly to the mixer 17, and another proportion flows into the reservoir 53 and is stored. Consequently, by proper operation of the valves 54 and 55, the metal may be transmitted to the mixer 17 in any desired amount and in any desired proportion, respectively, between the direct transmission through line 51 and the indirect from the metal reservoir 53.

A similar thing is done with the gas by providing the gas conduit 13 with a side line 61 with a gas reservoir 62 in conjunction with a valve 63 and a two-way pump 64, capable of pumping either to or from the reservoir 62. The valve 63 may be controlled through control transmission 65 and the pump 64 may be similarly controlled through transmission 66. Therefore, hydrogen may be received at the mixer 17 in any desired proportion through proper operation of the pumps 14 and 64 and of the valves 63.

Depending upon the capacities of the reservoirs 53 and 62, the proportion and amount of outgassed metal and hydrogen reaching the mixer 17 may be controlled over a period of time independently of the rate at which the metal and hydrogen leave the separator 12 or reactor 10. Thus, chemical energy may be considered as being stored in the reservoirs, since the reaction at 10 was endothermic. The rate of heat delivery to the heat exchanger 11 is produced by the reaction of hydrogen and metal there; so it can be controlled independently of the rate at which the heat is taken from the reactor 10.

If the reservoirs 53 and 62 are not to be exhausted or filled beyond their capacity, the average rate at which heat is exchanged at the heat exchanger 11 should be equal to the average rate at which it is produced at the reactor 10. This requirement may be met by the proper system design, but the structure shown in FIG. 3 does make it possible to exert control over the time and temperature cycle over short-term periods, particularly at those when the reactor power level is to be changed, or in cases where very large quantities of heat or very high temperatures are required at the heat exchanger for short periods.

The system shown in FIG. 3 may be used to exert similar control over the reactor 10 for short periods of time without disturbing the conditions of heat transfer at the heat exchanger 11. Each of the three factors previously mentioned for reactor control may be varied over a limited period of time within the reactor 10 without affecting the heat exchanger 11. The hydride flow rate may be increased by changing the pressure and metal flow rate at the heat exchanger 11 in such amount that the heat transfer rate there is as desired for the new flow rate of hydride being pumped by the pump 21 to the reactor 10; this will cause an increase in the reactor power level. Also, the state of ingassing of the hydride (the relative amount of hydrogen in the metal) may be changed without restriction upon the rate of heat exchange at the heat exchanger 11 by suitable operation of the pumps and valves associated with the reservoirs 53 and 62. These variations are permissible within the capacities of the reservoirs and within the rather broad operating limits of the heat exchanger 11.

The system just described possesses some singular advantages. The heat exchange medium and the equipment associated with it outside the reactor 10 are much less radioactive than conventional heat transfer media and their systems. In consequence, far less shielding is required, both against heat loss and against radioactivity. Heat may be stored in the reservoirs 53 and 62 in the form of *chemical* energy at lower temperatures, aiding in and obtaining independence of the heat exchanger 11 and the reactor 10 over limited periods of time. The nuclear reaction may be controlled and stabilized simply by changing the composition of or the flow rate of the hydride into the reactor 10 or the pressure of the hydrogen gas within the reactor 10.

As stated earlier, the heat of reaction of metal hydrides permits great increases in efficiency. For example, when lithium hydride is used, approximately one-thirty-fifth (0.029) as much mass is circulated per unit time for the same heat transfer until as when liquid sodium, a conventional heat exchange medium, is used. One the volume basis, about one-twenty-ninth (0.034) as much lithium is circulated. Thus a great reduction in the volume of the reactor and heat exchanger becomes possible. Also, the use of the same mass of material for both heat exchanger and moderator permits its location in the very center of the reactor 10 where the heat is generated by the chain-reaction neutrons bombarding among the fuel elements 30. Also, since the same mass of material is used additionally as a radiation shield around the reactor, efficiency is further increased. Also, the heat-exchange medium is preheated by what would normally be waste energy falling out through the shielding. All these factors work together to give much more compact design resulting in a lighter reactor 10. Even more important is the reduction in the amount of shielding material required to shield the reactor 10 against radioactivity. This reduction is possible because, when employing the principles of the invention, the shielding materials may be placed much closer to the reactor core than in conventional reactors, and in addition the heat-transfer medium itself, which will be in close proximity to the fuel elements, has good shielding properties. For a given radioactive strength, the thickness of shielding material required to produce a definite attenuation will remain constant, but since the volume is considerably decreased, when using the principles of the invention, the amount of material required is decreased.

So far as the possible radioactivity of any of the processed materials is concerned, note that any material whose level of radioactivity becomes too high may be held in a suitable reservoir 62 or 53 until it is again safe to be circulated through the remainder of the system, while such delay is not feasible with conventional heat transfer media, at least not to the same degree. Another important factor in this regard is that the outgassed hydrogen cannot become radioactive when kept pure and hence can be circulated immediately to the system with a minimum of shield.

Figure 4:
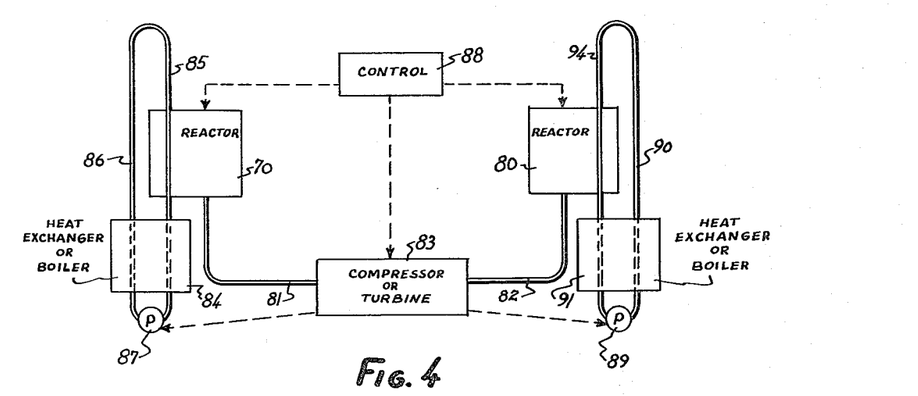
FIG. 4 is a block diagram of a dual nuclear reactor system employing the principles of this invention, wherein two reactors are connected and wherein there is no flow of heat exchange medium except of hydrogen gas.
Figures 5, 6, 6A:
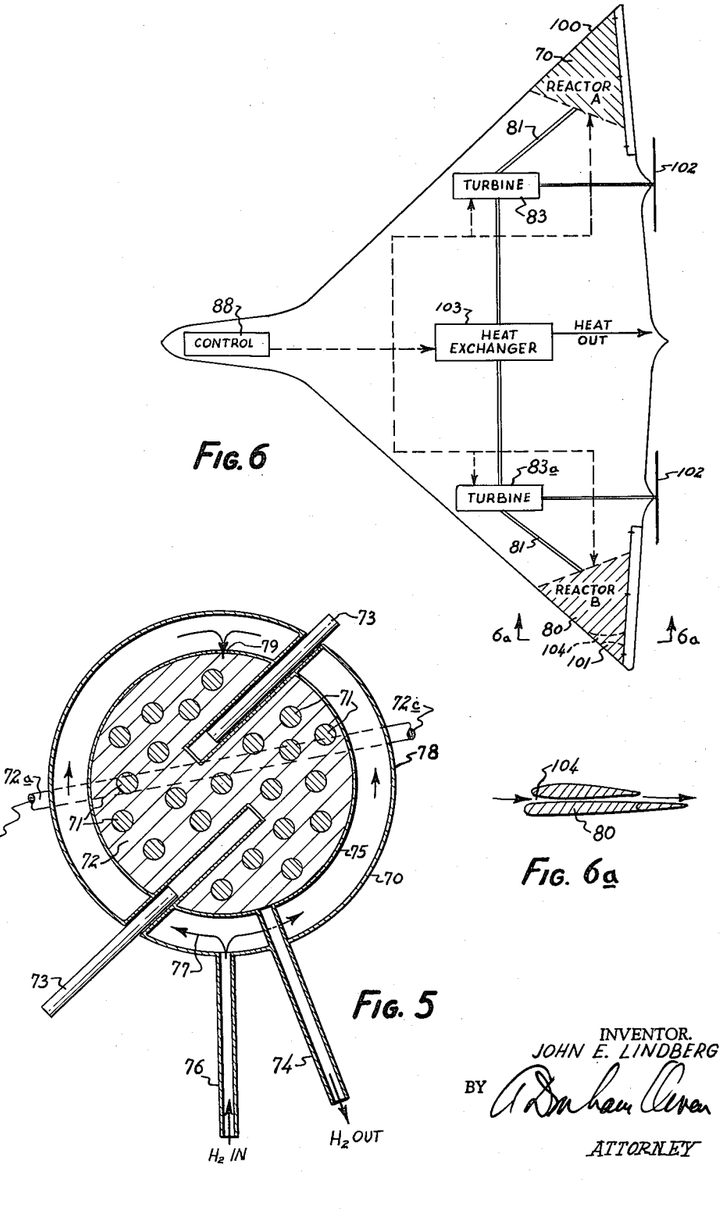
FIG. 5 is a view generally similar to FIG. 2 of a modified form of nuclear reactor suitable for use in the system of FIG. 4.
FIG. 6 is a diagrammatic indication of an aircraft employing the dual nuclear reactor system of FIG. 4 and wherein the hydrogen gas passing between the two reactors is used to power a pair of turbines.
FIG. 6a is a view taken in section along the line 6a—6a in FIG. 6.

FIGS. 4 and 5 show another important application of the invention. Here gas alone is transferred cyclically from a nuclear reactor 70 to another reactor 80 through conduits 81 and 81a. It will be seen that this mechanism of gas transfer effectively causes heat to flow cyclically between the reactors. FIG. 5 schematically depicts a spherical reactor configuration which may be employed in conjunction with the system shown in FIG. 4, wherein only the gas is to be transferred. In a reactor 70 uranium fuel elements 71 are placed as discrete bodies within a surrounding, porous, heat-exchange and moderating medium 72, which, for example, may be the hydride or zirconium or lithium $^7$, constructed in a porous form, or both may be used together in a mixture or alloy type of arrangement. Although spherical symmetry of both the fuel and moderator elements is shown in this view, it is also possible to employ the arrangement shown in FIG. 2 if the moderator is fixed and porous, permitting gas flow through the passages 33.

It is important that the heat transfer agent 72 retain its porous structure throughout the reactor's cycle of operation. As an aid to achieving this end, an additional heat transfer line 72a is embedded in the reactor core and is shown schematically entering and leaving the reactor 70 at points 72b and 72c. The mechanism of operation and materials for this additional heat transfer line 72a is explained fully in my co-pending patent application Serial No. 695,357, filed November 8, 1957 (see the description of FIGS. 1–4). As will be explained, this additional heat transfer operation may be instituted by means of a central control 83 as indicated schematically in FIG. 4.

In operation, the heating of the heat-transfer and moderating agent 72 due to the nuclear reaction among the fuel elements 71 causes the gaseous elaboration of hydrogen, an endothermic reaction. Such heating may be begun by withdrawing control rods 73, which may be of cadmium, for example. The liberated hydrogen passes through the pores and is drawn off through a conduit 74. As a result, the rate of nuclear reaction is decreased, because the moderator efficiency decreases consequent to its outgassing, as previously described. Similarly, the introduction of hydrogen under pressure to the reaction chamber 75 through a gas inlet 76 causes an increase in the moderating efficiency and therefore an increase in the reactor energy level. This reaction is accompanied by the exothermic liberation of heat, and in order that the porous form of the agent 72 be maintained, this additional heat may be drawn off by additional heat transfer medium circulated through the conduit 72a. The reaction chambers 75 may be partially shielded by passage of the hydrogen in a passage 77 between it and an outer shell 78 before passing through an orifice 79 into the reaction chamber 75.

The reactors 70 and 80 in FIG. 4 may be identical, and both may be of the type shown in FIG. 5. They are connected together by gas transfer lines 81 and 82 between which is a suitable compressor or turbine 83. The reactor 70 has associated with it an external heat exchanger 84, which is connected to the reactor 70 by means of conduits 85 and 86, which are branches of or correspond to the line 72a of FIG. 5. A pump 87, preferably located at the lowest point of the heat exchanger 84, serves to circulate the external heat exchange medium through lines 85 and 86. This location of the pump 87 is desirable so that when it is not functioning, all of the metal component of the external heat-exchange medium will fall into a reservoir (not shown) located within the heat exchanger 84, thus insuring that the line 85 passing through the reactor 70 is cleared of metal. A similar arrangement for the reactor 80 is also shown. A central control 88 is provided to actuate the various pumps and mechanisms to be described shortly. The control transmissions are shown as dotted lines in FIG. 4.

The cycle of operation is as follows: First assume that the external heat transfer medium to be circulated through the reactors 70 and 80 by pumps 87 and 89 is one of the liquid hydrides as explained in my previously referred to patent application; however, powdered hydride systems will be equally applicable. Let the heat transfer moderating medium 72 of the reactors 70 and 80 be zirconium hydride for example. Assume that before starting the cycle of operation, the heat-transfer and moderating medium 72 of the reactor 80 is sufficiently degassed so that it consists substantially of porous zirconium metal, for example. Also, the heat transfer medium 72 of reactor 70 is to be fully ingassed with hydrogen. Further, assume to begin with that both reactors 70 and 80 are inactive because of the insertion of the control element such as the cadmium rods 73. The pumps 87 and 89 are inoperative.

The first step in the cycle, which will be instituted by the central control 88, is to activate the pump 89 in a heat exchanger line 90 of the reactor 80, so that it circulates the external heat-exchange medium 72 of the reactor 80 through a heat exchanger 91. Since the pump 87 is inoperative, the line 85 will be cleared of metal as explained previously and, as such, is not susceptible to radioactivity from the possible reactions within the reactor 70. Then the control 88 activates the withdrawal of the control rods 73 from the reactor 70 only, and simultaneously starts the compressor 83. As the reactor 70 becomes critical due to the removal of the control rods 73, its temperature rises and, as a result, the zirconium hydride is dissociated; so hydrogen gas is liberated from it and is transferred to the reactor 80 by means of the compressor 83 and conduits 81 and 82. The compressor also increases the pressure of the hydrogen at the reactor 80. There the hydrogen gas reacts with the zirconium metal to form zirconium hydride in an exothermic reaction. Since the external heat transfer medium of reactor 80 is being circulated by the pump 89, this additional exothermic heat is then transferred to a heat exchange line 94, as explained in my referred-to patent application (see FIG. 4 there), and may be made to do further work as illustrated by the presence of a heat exchanger or boiler 91. Thus the heat originally produced by the reaction of reactor 70 has now been effectively transferred to the reactor 80 solely by moving the evolved hydrogen gas through the transfer lines 81 and 82.

As described previously, the elaboration of hydrogen from the hydride in the reactor 70 tends to slow down the nuclear reaction therein. When the reaction at 70 slows down sufficiently, the control 88 senses this and activates the insertion of the cadmium rods 73, thus stopping the reaction. At the same time, the control 88 operates to turn on the pump 87 which causes the circulation of the external heat-transfer medium in the heat exchanger 84 through the reactor 70 via lines 85 and 86. Simultaneously, the control 88 causes the pump 89 to stop, thereby insuring that the line 94 of the reactor 80 will be cleared of metal as explained previously. Also, the control 88 reverses the sense of the compressor 83 so that it will draw any hydrogen from reactor 80 to the reactor 70. The control 88 senses when this part of the operation is complete and then activates the withdrawal of the control rods 73 from the reactor 80, allowing the reactor 80 to become active. Its temperature rises, and the zirconium hydride previously formed is outgassed in an endothermic reaction and the liberated hydrogen is drawn off by the compressor 83 and forced into the reactor 70.

At the reactor 70, the hydrogen combines with the heat-transfer moderating agent 72, which is now substantially zirconium metal, in an exothermic reaction. As before, in connection with reactor 80, the liberated heat is transferred to the heat exchanger 84 and may be made to do external work. The movement of the external heat exchange medium in the lines 85 and 86 is preferably operated cyclically under the control of the pump 87 to flow only during the time when the reactor 70 is non-reactive but is receiving heat in the exothermic recombination of hydrogen with the previously outgassed heat transfer moderating agent 72, this hydrogen being received from reactor 80. Similarly, at the reactor 80, it is preferable to operate the pump 89 only during those time that the reactor 80 is substantially non-reactive. This desirable to eliminate or reduce the hazard of possible radioactivity of the external heat exchange medium. The presence of hydrogen at all times within the lines 85 or 94, when the reactor is active, does not present difficulties because pure hydrogen essentially does not become radioactive.

The preceding description essentially describes the operation of one complete cycle. When this cycle is complete, the control 88 again activates a new cycle, as explained. If it is desired that the arrangement be used to produce usable work in addition to that gained at the heat exchangers 91 and 84, the hydrogen liberated at the reactors, say the reactor 70, is permitted to build up pressure of its own accord and leave the reactor 70 under high pressure where it passes through a gas turbine at 83, doing work as it flows past and into the reactor 80. Alternatively, the compressor or turbine 83 may be eliminated entirely. The hydrogen would then be transferred through line 81, 81a by means of the pressure built up in the active reactor during the gaseous elaboration of hydrogen. Additional simplification of the design may also be achieved by using the compressor 83 as the external source of power for the pumps 87 and 89.

This method of operation of the two nuclear reactors 70 and 80 possesses several advantages over current operational practice. For one thing, since no metal or metal hydride leaves either reactor 70 or 80, no shielding is required for the gas transfer line 81 or for the turbine or compressor 83, because the hydrogen does not become radioactive. Also, transfer of the reactor heat is accomplished under conditions which avoid exposing the heat transfer media of the heat exchangers 91 and 84 to appreciable radiation, so that little or no shielding need be provided for their heat transfer lines or the heat exchangers themselves.

Moreover, when metal hydride heat transfer systems are used for heat transfer, little or no thermal insulation is required, inasmuch as the primary heat transfer is due to the heat of transformation between the metal and the hydrogen as they are separated at the reactor and combined a the heat exchanger. These factors clearly reduce the cost and weight of the installations. Still further, no appreciable thermal shielding need be provided around the line 81, since the primary transfer of energy in this case is in the form of chemical energy rather than the specific heat of the gas.

Figure 7:
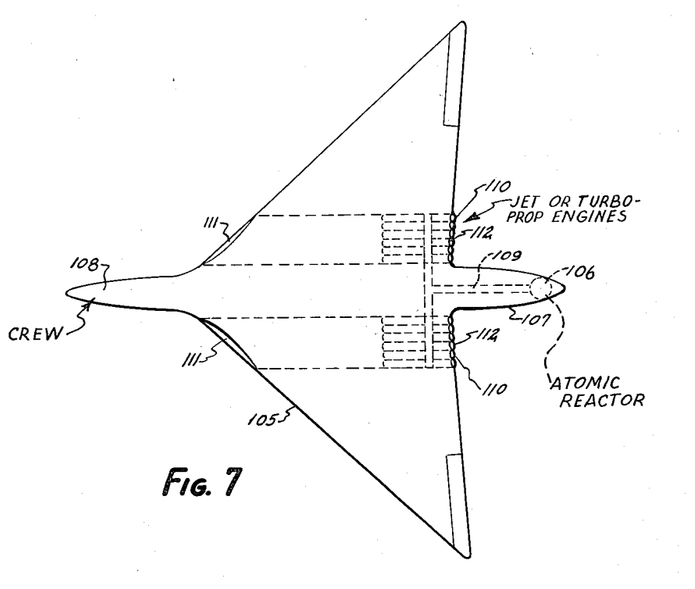
FIG. 7 is a view generally similar to FIG. 6 showing a modified form of aircraft arrangement.

These advantages may be applied to a system of nuclear aircraft propulsion illustrated in FIG. 6. Here the reactors 70 and 80 are shown placed at or near wing tips 100 and 101, this location requiring less shielding against radioactivity for protection of personnel. Alternately, both reactors 70 and 80 could be located together in a fuselage within a single shield, as shown in FIG. 7. The light unshielded gas transfer line 81 may connect the reactors 70 and 80 to turbines 83 and 83a mounted at any suitable locations and used to drive propellers 102.

The control mechanism 88 may also be located at any conventional position in the aircraft. For application of the system to aircraft propulsion, the heat exchangers 84 and 91 shown in FIG. 4 would normally be omitted but, if desired, that heat transferred by the high specific heat of hydrogen may be removed by a heat exchanger 103 in the gas transfer line 81. For example, this heat may be used for de-icing purposes.

In case the heat exchangers 84 and 91 of FIG. 4 are not employed in the scheme of FIG. 6, it may be desirable that additional cooling of the reactors 70 and 80 be provided over and above that provided by natural convection and heat radiation. This cooling may be obtained by providing several orifices 104 through the reactors 70 and 80, as shown in FIG. 6a. This method of additional cooling and energy removal from the reactors also provides the advantage that cool air entering the orifice will be heated as it passes through and as such will provide substantial additional thrust to the vehicle according to the general principles of gas dynamics.

The unique combination of reactor and heat transfer media has the advantage of being capable of transferring the heat energy through long lines with no heat shielding, since the primary heat energy transfer will be by the heat of reaction between the hydrogen and the outgassed metal as they separate at the reactor and combine at the heat exchanger, and not in the specific heat of the heat transfer medium.

Another important advantage is that little radiation shielding of the heat transfer lines and heat exchanger is needed, due to the short half-life of the heat transfer media used, if they do become radioactive. The radiation shielding can be further decreased by using the heat transfer cycle described for FIG. 4 above.

FIG. 7 shows an alternate aircraft atomic power plant arrangement. Aircraft 105 has its atomic reactor 106 located on a boom 107 at the back of the aircraft. This arrangement makes possible ready provision (by mechanical means on the ground) of a large shield to protect the crew, passengers, and ground personnel while the aircraft 105 is on the ground. In flight, the crew and passengers are located at the nose 108, well away from the atomic reactor 106. This design can bring about considerable reduction in the amount of radiation shielding required. Lines 109 are for power transmission from the reactor 106 to engines 110.

If the system of FIG. 4 is used in the aircraft 105, then the reactors 70 and 80 are located together at 106, lines 109 are the gas transfer lines 81 and 82, and engines 110 are replaced by the turbines 83, which drive propellers like the propellers 102 in FIG. 6. Alternately, if the power transmission systems of FIGS. 1 or 3 are used, then the lines 109 of FIG. 7 are the gas conduit 13, the metal conduit 15, and the hydride conduit 20 of FIGS. 1 and 3, which transfer efficiently large quantities of heat from the reactor 106 to turbojet engines 110. This heat is used to heat and accelerate air taken in at air scoops 111 and ejected at high velocity at outlets 112 to give thrust.

Although the system shown herein provide separate tubes for the metal and gas as it is pumped from the reactor to the heat exchanger, it is, of course, obvious that they can be pumped together in a single tube, as is covered in my co-pending application Serial No. 695,357, filed November 8, 1957. This arrangement simplifies the system considerably but results in some loss of flexibility of control and some loss of efficiency, as the tube will operate hot.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A system including in combination a heat-producing nuclear reactor; a recombiner with cooling means; means for supporting a metal hydride of the group consisting of lithium, sodium, potassium, rubidium, cesium, calcium, strontium, barium, scandium, yttrium, the rare earth metals (atomic numbers 57–71) titanium, zirconium, hafnium, vanadium, niobium, tantalum, palladium and chromium, and alloys of said group with each other to said reactor for endothermic decomposition therein; means for removing and separating resulting metal and hydrogen from each other; and means for separately conducting them to said recombiner for exothermic recombination.

2. The system of claim 1 wherein the means for conducting the metal from the separating means to the recombiner includes two conduits, one having pumping means and the other both pumping means and a reservoir.

3. The system of claim 1 wherein the means for conducting the gas from the separating means to the recombiner includes a first pump and a branch conduit having a valve, a two-way pump, and a gas reservoir in series.

4. A system including in combination a heat producing nuclear reactor; a recombiner with cooling means, means for supplying a metal hydride of the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, chromium, and alloys of the members of said group with each other to said reactor for endothermic decomposition therein: means for moving and separating resulting metal and hydrogen from each other and for separately conducting them to said recombiner for exothermic recombination; and means for conducting the recombined said metal hydride to said reactor, whereby the system performs an endless cycle of decomposition and recombination.

5. The system of claim 4 wherein each said means for conducting includes a pump.

6. The system of claim 4 wherein said means for conducting the metal from the separating means to the recombiner includes two conduits, one having a pump, a metal reservoir, and a valve in series, the other having a valve and a pump in series.

7. The system of claim 4 wherein the first-named means for conducting includes pump means and the second-named means for conducting includes valve means.

8. A heat transfer method for transferring heat from a nuclear reactor to a heat exchanger, comprising exothermically combining at said heat exchanger hydrogen and a metal chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium and alloys of said group with each other, into metallic hydride, conducting said metallic hydride from said heat exchanger to said reactor, outgassing said hydride endothermically at said reactor, separating the outgassed metal from the hydrogen, conducting the metal and hydrogen separately to said heat exchanger, and recombining them there exothermically, and repeating the cycle indefinitely.

9. An atomic heat-transfer system comprising a nuclear reactor; a heat exchanger having a reaction chamber and cooling means; metallic hydride chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium hydrides and hydrides of alloys of said group with each other, in said reactor dissociated by the heat transferred from said reactor to said hydride with resultant cooling of said reactor by the endothermic dissociation of said hydride; metal chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium and alloys of said group with each other, in said heat exchanger reaction chamber; and means to conduct the hydrogen liberated from said hydride at said reactor to said heat exchanger for combination with the said metal supplied thereto in an exothermic reaction transferring heat to said cooling means.

10. The system in claim 9 wherein said means to conduct hydrogen includes power-converting means for utilizing the movement of said hydrogen to produce external power.

11. The system of claim 9 also having means for transferring metal formed by the decomposition of said hydride from said reactor to said heat exchanger reaction chamber separately from said hydrogen, and means for transferring from said heat exchanger reaction chamber to said reactor the metallic hydride formed by the exothermic reaction of the metal and the hydrogen at said heat exchanger reaction chamber, said metallic hydride having been cooled by said cooling means at said heat exchanger to remove the heat that is transferred from said reactor in the form of latent heat.

12. The system of claim 9 wherein said heat exchanger comprises a second nuclear reactor, each said reactor having additional control means for converting it between an active status where it functions as a reactor and an inactive status where it functions as a heat exchanger, only one said reactor being in active status at any time with the hydrogen then being moved therefrom.

13. In an atomic energy installation having a nuclear reactor and a heat exchanger with cooling means remote from said reactor, a heat transmission system comprising means at said reactor for endothermically transforming the hydride of metal chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium and alloys of said group with each other, by heat produced by said reactor, into its metal and hydrogen, means for transferring at least the resultant hydrogen to said heat exchanger, and means at said cooling means for exothermically transferring metal chosen from the same group and said hydrogen into metallic hydride.

14. The installation of claim 13 wherein the metals employed are poor moderators and the hydrides are excellent moderators, thereby maintaining automatic power stability control.

15. In an aircraft having a main frame and a pair of nuclear reactors supported by said frame at opposite sides thereof, the combination therewith of: heat exchange conducting means including a hydride of metal chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium and alloys of said group with each other in each said reactor; means to conduct hydrogen from one said reactor to the other when the heat in said one reactor decomposes the hydride; additional control means for each said reactor to activate the reactors alternately; and turbine power take-off means in the hydrogen-conducting means for converting power from the conducted hydrogen to use in powering said aircraft.

16. A power plant for use in aircraft or other vehicles comprising a heat-producing nuclear reactor having a heat-exchange system with cooling means, heat transfer means employing the hydride of a metal chosen from the group consisting of lithium, sodium, potassium, rubidium, cesium, calcium, strontium, barium, scandium, yttrium, the rare earth metals (atomic numbers 57–71), titanium, zirconium, hafnium, vanadium, niobium, tantalum, palladium, and chromium and alloys of said group with each other, and its dissolution products for conveying heat from said reactor to said heat-exchange system, said heat transfer means including means for separating hydrogen gas from the said metal and means for conducting at least said hydrogen gas; and means for converting said heat into thrust power.

References Cited in the file of this patent

UNITED STATES PATENTS

| | | |
|---|---|---|
| 2,885,159 | Ashwood | May 5, 1959 |
| 2,894,891 | Grebe | July 14, 1959 |
| 2,909,486 | Colichman | Oct. 20, 1959 |
| 2,917,443 | Grebe | Dec. 15, 1959 |

OTHER REFERENCES

Glasstone: Principles of Nuclear Reactor Engineering, July 1955, page 486. (Copy in Scientific Library.)

ORNL–2891, An Evaluation of Solid Moderating Materials, Apr. 25, 1960, pages 1–6. (Copy in Div. 46.)

UNITED STATES PATENT OFFICE
CERTIFICATE OF CORRECTION

Patent No. 3,116,212　　　　　　　　　　　　　　　December 31, 1963

John E. Lindberg, Jr.

It is hereby certified that error appears in the above numbered patent requiring correction and that the said Letters Patent should read as corrected below.

Column 2, line 7, for "exchange" read -- exchanger --; line 31, for "upon" read -- up --; same column 2, line 72, for "grams" read -- gram --; column 5, line 4, after "flow", in italics, insert -- of --, in italics; column 7, line 48, for "One" read -- On --; column 8, line 21, before "fuel" insert -- or thorium --; line 23, for "or" read -- of --; column 10, line 17, after "This" insert -- is --; column 11, line 58, for "system" read -- systems --; column 12, line 2, for "supporting" read -- supplying --; column 13, line 44, for "transferring" read -- transforming --.

Signed and sealed this 30th day of June 1964.

(SEAL)
Attest:

ERNEST W. SWIDER　　　　　　　　　　　　　　　EDWARD J. BRENNER

Attesting Officer　　　　　　　　　　　　　　　Commissioner of Patents